United States Patent Office 3,669,519
Patented June 13, 1972

3,669,519
ANTICREEP BEARING ASSEMBLY FOR AN ANTIFRICTION BEARING
Tadanobu Takahashi and Kunihiko Usami, Fujisawa, Japan, assignors to Nippon Seiko Kabushiki, Tokyo, Japan
Filed Dec. 2, 1970, Ser. No. 94,450
Claims priority, application Japan, Dec. 9, 1969, 44/116,336
Int. Cl. F16c 33/30
U.S. Cl. 308—236
3 Claims

ABSTRACT OF THE DISCLOSURE

Anticreep bearing assembly provided with an anticreep ring for frictional engagement with each of a pair of radically spaced annular surfaces. The anticreep ring having a resilient property is provided with at least two outwardly or inwardly expanded arched portions and an intermediate arched portion between the outwardly or inwardly expanded arched portions. The anticreep ring is fixed at its seated position by engagement of at least a portion thereof with an annular groove which is formed at a deviated position upon a fitting periphery surface of outer ring or inner ring.

BRIEF ILLUSTRATION OF THE INVENTION

The present invention relates to an anticreep bearing assembly, more particularly to an anticreep bearing assembly utilizing an elastic ring having a split to enable its insertion into a cylindrical clearance between an outer periphery of an outer ring of an antifriction bearing and an inner surface of a bore formed in a housing, or an inner periphery of an inner ring of the antifriction bearing and a periphery of a shaft so that rotation of the outer or inner ring can be restrained. The above-mentioned rotation of the outer or inner ring is hereinafter referred to as "creep."

Generally, in the machine assemblies utilizing antifriction bearings, fitting a component of a circular peripheral outline in a receiver opening also having a circular peripheral outline, loosen in accordance with increase of the clearance therebetween, so that it becomes necessary to observe creep of an outer ring or inner ring of the antifriction bearings. Condition of the above-mentioned loosening of the fitting varies in accordance with material-quality of the housing, structure of elements about the bearing, temperature elevation of the housing and bearing during practical use of the bearing. When the above-mentioned creep is created, the function or accuracy of the bearing is injured. Further, the engaging peripheral surface of a receiver, which receives the bearing, is remarkably worn so that the creep further grows and finally, the destruction of the machine assembly must inevitably be avoided in a short time. For example, in the case of using a bearing housing made of a light alloy, or in the case of a machine assembly applying "clearance-fitting" of the outer circular peripheral outline of an outer ring in a receiver opening of circular peripheral outline, so as to prevent the increased thrust loading imparted to the bearing, which is caused by an elongation of a shaft in accordance with rising temperature of the metal, or so as to attain easy operation for assembling or disassembling the machine assembly, the growth of the creep is so distinguished that the durability of the bearing and the machine assembly is remarkably injured.

Accordingly, many attempts have been made to eliminate the above-mentioned drawbacks caused by "creep." However, most of the attempts are required to work the housing or shaft, for example, to provide the housing or shaft with a groove or cut-off portion. Therefore, besides the above-mentioned additional work, the assembling operation of the machine assembly becomes very complicated. Further, the available size of the bearing is restricted so that the available range of the bearing is restricted.

In the above-mentioned illustration, a component of a circular peripheral outline means "an outer or inner ring of the antifriction bearing," while a receiver means "a housing for receiving the outer ring or a shaft which engages with the inner ring."

It is a principal object of the present invention to provide an anticreep bearing assembly having a remarkable capability for restraining creep.

Another object of the present invention is to provide an anticreep elastic ring which can be easily assembled together with an antifriction bearing in a bearing housing without any additional working of the receiver so that the above-mentioned drawbacks can be eliminated.

DETAILED DESCRIPTION

Figure 1:
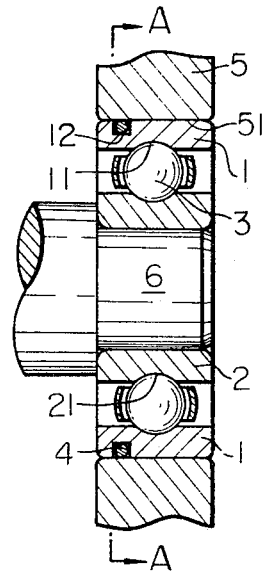
FIG. 1 is a sectional view of a typical antifriction bearing assembly utilizing an anticreep ring, according to the present invention.
Figure 2:
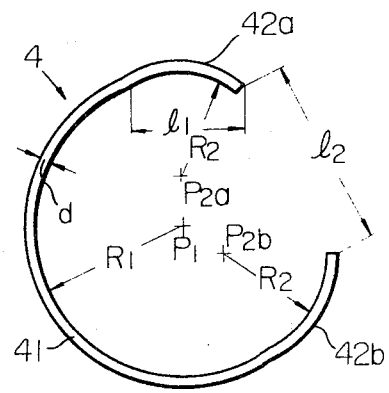
FIG. 2 is a plan view of an anticreep ring according to the present invention.
Figure 3:
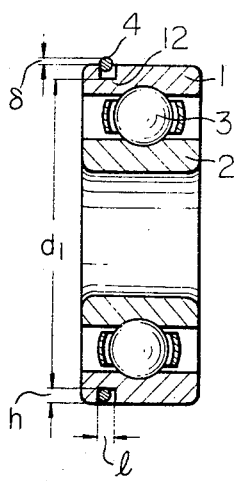
FIG. 3 is a sectional view of an antifriction bearing attached to an anticreep ring, according to the present invention.
Figure 4:
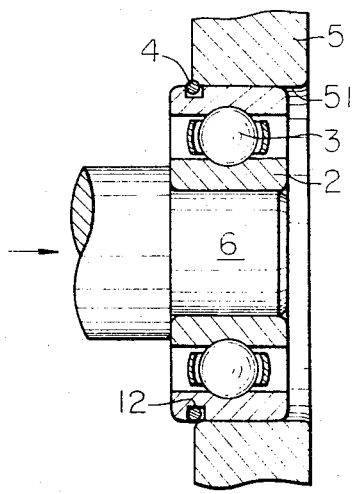
FIG. 4 is a sectional view of antifriction bearing assembly axially illustrating a pre-loaded condition.

Referring to FIGS. 1, 2, 3, 4 and 5, there is provided an antifriction bearing having an outer bearing ring 1 provided with a race 11 and an inner ring 2 provided with a race 21. Antifriction elements such as balls 3 are provided for travel in the races 11 and 21 in a well-known manner. The above-mentioned bearing is received in a bore of a housing 5 while the inner ring 2 supports a shaft 6. In the above-mentioned bearing assembly, an anticreep ring 4 is interposed between the bore of the housing 5 and an annular groove 12 of the outer ring 1. In the above-mentioned assembly, the outer ring 1 is received within a fitting surface 51 of the bore of the housing 5 with a slight clearance so as to attain an easy assembling operation, while the shaft 6 is seated with a tight fit in an engaging force of the inner ring 2. The annular groove 12 is formed upon the peripheral surface of the outer ring 1 in such a way, that the groove 12 is located at a peripheral position deviated from a central peripheral position of the outer ring 1 as shown in FIGS. 1, 2 and 4.

The radial cross section of the groove 12 has sufficient width ($e$) and depth ($h$) to easily receive the anticreep ring 4 having a resilient property.

The anticreep ring 4 is formed of springy wire composed of a pair of outwardly expanded arched portions 42a, 42b and an intermediate portion 41 having a shape of a portion of a circular ring having a radius $R_1$. Radius of the arched portions 42a or 42b is represented by $R_2$ which is smaller than $R_1$. For the convenience of illustration, center of curvature of these arched portions 41, 42a and 42b are shown in FIG. 2 as $P_1$, $P_{2a}$ and $P_{2b}$. Further, the arched portions 42a and 42b are positioned at the symmetrical positions with respect to the intermediate arched portion 41. In other words, the arched portion 42a is located at a symmetrical position to the arched portion 42b wlith respect to the center $P_1$.

The radius $R_1$ is slightly smaller than half the diameter of the bottom surface of the annular groove 12 so that the anticreep ring 4 can be resiliently seated in the groove 12. Distance between both ends of each arched portions 42a and 42b is represented by $l_1$, and distance between the free ends of these two arched portions 42a, 42b is represented by $l_2$. The size of the distance $l_2$ should be decided so as to prevent free separation of the anticreep ring 4 from the annular groove 12 in connection with the resilient property of the ring 4. The thickness $d$ of the ring 4 is slightly smaller than the depth $h$ of the annular groove 12.

Figure 5:
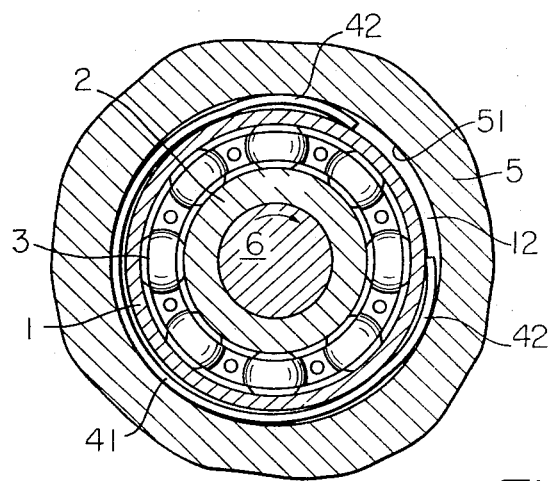
FIG. 5 is a sectional view of the antifriction bearing assembly taken along line V—V in FIG. 1.

The above-mentioned ring 4 is firstly seated in the annular groove 12 as shown in FIG. 3, and then the bearing holding the shaft 6 is inserted into the bore of the housing 5 in a direction of an arrow B, the expanded arched portions 42a, 42b, which are projected from the peripheral surface of the outer ring 1, are resiliently deformed so as to fit into the annular groove 12 in accordance with the peripheral edge portion of a bore of the housing 5, so that the outer ring 1 can be gradually inserted into the bore of the housing 5, while the expanded arched portions 42a and 42b resiliently contact the bore of the housing 5. By the above-mentioned assembling operation, the bearing assembly as shown in FIG. 1 can be produced. The anticreep ring 4 is deformed by the above-mentioned assembling operation. However, since the ring 4 is made of resilient metal, the middle portion of the expanded arched portions 42a, 42b and the middle portion of the intermediate arched portion 41 are urged to the fitting surface 51 of the bore of the housing 5, while a pair of connected portions between the intermediate portion 41 and the respective outwardly expanded arched portions 42a, 42b are urged to the bottom surface of the annular groove 12 of the outer ring 1 and a free end portion of each expanded arched portion 42a, 42b is also urged to the annular groove 12, as shown in FIG. 5.

Since the fitting surface 51 of the bore of the housing 5 is a conventional cylindrical surface without any particular finishing work performed thereon, the outer ring 1 is capable of being axially displaced in accordance with an elongation of the shaft 6 which is caused by rising temperature of the antifriction bearing.

Figure 6:
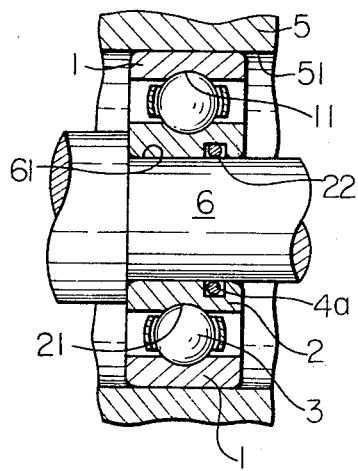
FIG. 6 is a sectional view of another embodiment of an antifriction bearing assembly utilizing an anticreep ring of another type, according to the present invention.
Figure 7:
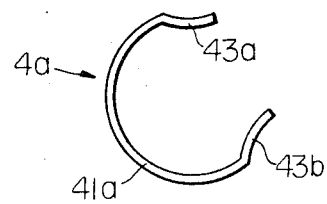
FIGS. 7 and 8 are plan views of other anticreep rings according to the present invention.

Another embodiment of the bearing assembly utilizing the anticreep ring of the invention is shown in FIG. 6, while the anticreep ring applied to the assembly shown in FIG. 6 is shown in FIG. 7. In this embodiment, an annular groove 22 is formed upon an inside cylindrical fitting surface 61 of the inner ring 2 in such a way that the groove 22 is located at a position deviated from a central peripheral position of the fitting surface 61. In this assembly, the anticreep ring 4 is seated between the shaft 6 and the groove 22 in the same manner as the first embodiment. However, to attain the same effect as the first embodiment, the relative condition of the anticreep ring 4a in connection with the inner ring 2 and the shaft 6, is somewhat different from the first embodiment, that is, the anticreep ring 4a is composed of a pair of inwardly projected arched portions 43a and 43b and an intermediate arched portion 41a so that, in the assembling condition, since the ring 4a is made of a resilient metal, the anticreep ring 4a is deformed in such a way that the intermediate arched portion 41a is urged to the groove 22 while the inwardly projected arched portions 43a and 43b are urged to a peripheral fitting surface 61 of the shaft 6. In this embodiment, it is not required to work the fitting surface 61 of the shaft 6 to seat the anticreep ring 4a.

In the above-mentioned two embodiments, since the annular grooves 12 and 22 are located at the respective deviated positions which are deviated from the center of the respective races of the outer ring and inner ring troubles such as injuring the loading capacity of the antifriction bearing or injuring the inherent mechanical strength of the outer and inner ring are not caused.

Figure 8:
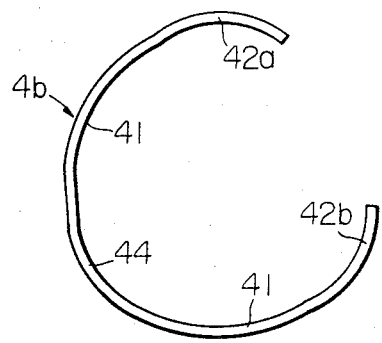
Figure 9:
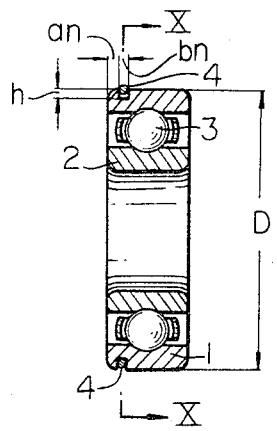
FIG. 9 is a cross-sectional view of an anticreep bearing assembly provided with an anticreep ring, according to the present invention, for illustrating dimensional relationship between components.
Figure 10:
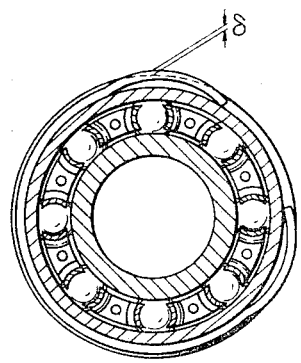
FIG. 10 is a cross-sectional view of the anticreep bearing assembly taken along a line X—X in FIG. 9.

Still another modified anticreep ring utilized for the present invention is shown in FIG. 8. This ring 4b has a similar shape to that of the first embodiment except for an outward expanded arched portion 44, which is formed at a middle portion of the intermediate arched portion 41. Therefore, in this embodiment, three outwardly expanded arched portions 42a, 42b and 44 are provided. It is required that these arched portions 42a, 42b and 44 should not be located at facing positions, with respect to a center of curvature of the intermediate arched portion 41, so as to increase the frictional resistance of the anticreep ring 4b with the receiver and the annular groove.

As is illustrated above, the anticreep ring utilized for the present invention, is easily manufactured from a resilient metallic wire having any cross-sectional shape. It is an advantage of the present invention that the precise quality control is not required for manufacturing the anticreep ring as long as the shape and size of the ring fit to restrain the creep without causing any troubles to the assembling operation. In the case of using the wire material having an identical spring-constant and identical cross-sectional shape and area, the frictional resistance which is required to restrain the creep, can be easily altered by changing the shape of the outwardly expanded arched portions 42a, 42b, or inwardly expanded arched portions 43a, 43b, that is, changing the curvature, the length and number of the above-mentioned outwardly or inwardly expanded arched portions. Consequently, various anticreep rings can be preferably applied for various sizes and shapes of the antifriction bearing assembled with the receiver.

Further, in the above-mentioned machine assemblies utilizing the anticreep ring according to the invention, the annular groove is formed only upon a peripheral surface of the outer ring or upon a peripheral inner fitting surface of the inner ring and the races of the outer and inner rings are not provided with any additional finishing work performed thereto and further, it is not required to use a shaft having a particular size. Consequently, the anticreep ring utilized for the bearing assembly of the present invention is available for various antifriction bearings which are generally used. Moreover, the above-mentioned anticreep ring can be applied for a sealed bearing. In the above-mentioned machine assembly, applying the anticreep ring of the present invention, since it is not required to perform any additional finishing work on the receiver, machine work of the receiver can be operated easily and when the receiver, antifriction bearing and anticreep ring are assembled, the assembling operation can be carried out very easily because no particular adjustment of fitting thereof is required.

EXAMPLE

Figure 11:
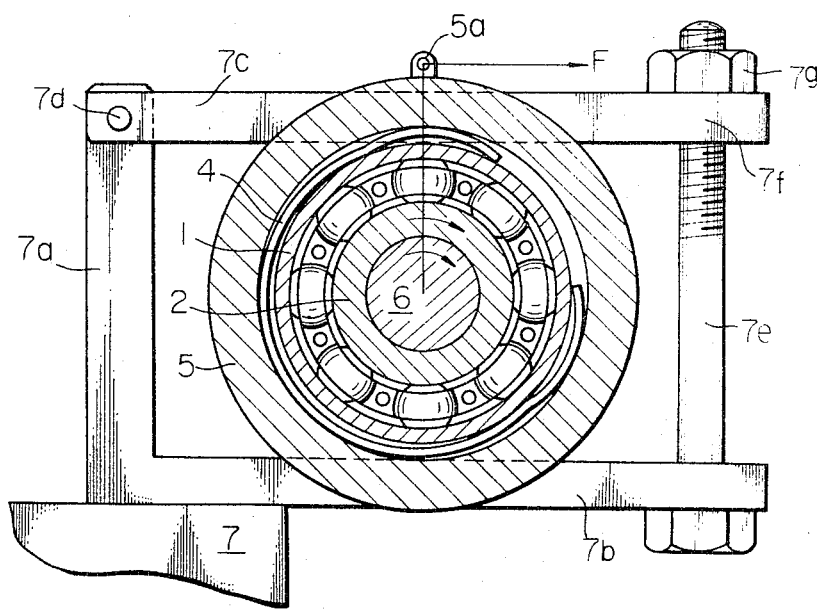
FIG. 11 is a schematic elevation of a device for measuring "creep-restrain moment" of the anticreep bearing assembly according to the present invention.

To obtain a creep restrain moment of the bearing assembly utilizing an anticreep ring, the following test is carried out by applying a very simple manner as shown in FIG. 11. In the measuring device shown in FIG. 11, the outer ring 1 of the assembly is held by a stational clamp 7 comprising a vertical arm 7a and an upper horizontal arm 7c turnably supported by a pin 7d disposed to a top portion of the arm 7a and a lower horizontal arm 7b fixed to a bottom of the arm 7a. The free end portion of the horizontal arm 7c is provided with an aperture 7f passing therethrough, and a bolt 7e vertically disposed upon the lower horizontal arm 7b passes through the aperture 7f so that the outer ring 1 is stationally clamped by the clamp 7 when the bolt 7e is set by a nut 7g as shown in FIG. 11. A hook is secured to a peripheral position of a housing 5 wherein the outer ring 1 is seated together with an anticreep ring 4. After completion of the above-mentioned preparation, a spring balance (not shown) is used to measure a force F (in kg.), which is required to commence the turning of the housing 5. Assuming a distance between a center of a shaft 6 and the hook 5a is X (in cm.), the creep restrain moment M can be calculated as $M=FX$ (in kg. cm.). By our measurement, the creep restrain moment M varies in accordance with the fitting clearance between the peripheral surface of the outer ring 1 and the peripheral fitting surface 51 of the bore of the housing 5.

Figure 12:
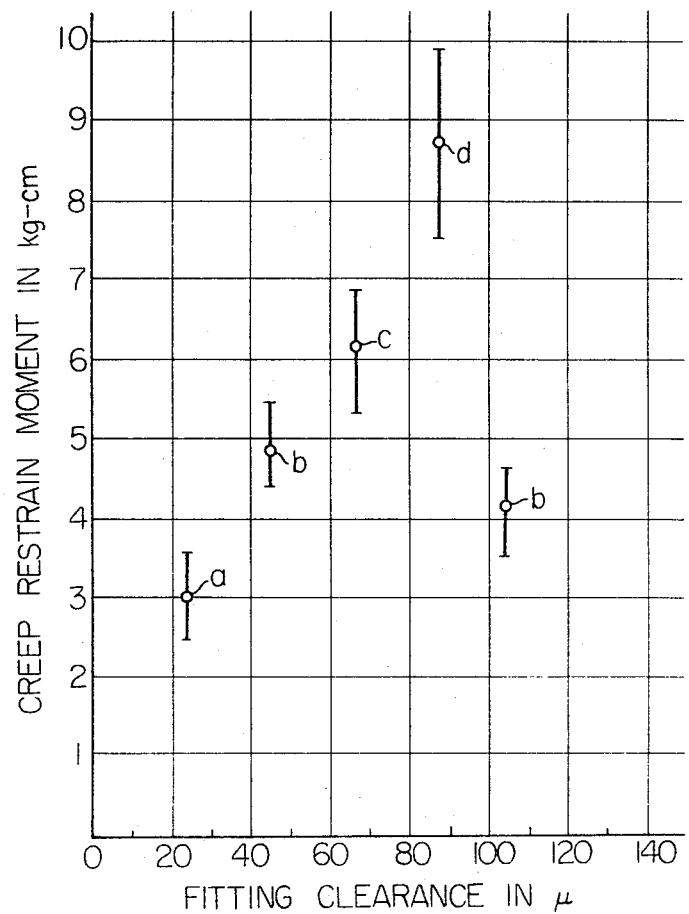
FIG. 12 is a diagrammatic illustration of the creep restrain moment of the anticreep bearing assembly of the present invention measured by the device shown in FIG. 11.

The following Table 1 shows various dimensions of the outer ring 1 and the anticreep ring 4 used for the above-mentioned measurement. The data of the above-mentioned measurement is shown in the data-diagram of FIG. 12, wherein the abscissa represents creep restrain moment (kg. cm.) while the ordinate represents fitting clearance between the peripheral surface of the outer ring 1 and the peripheral fitting surface 51 of the bore of the housing 5. The data of each measurement represents a range of 10 data. The bearing assembly represented by "Test piece a" is preferably applied for a vacuum cleaner for housekeeping, hand motor-drill, etc.

TABLE 1

| Test piece Number | Dimension of outer ring (in mm.) | | | | Dimension of anticreep ring (in mm.) | |
|---|---|---|---|---|---|---|
| | C | h | an | bn | dw | δ |
| a | 35 | 0.915 | 1.98 | 1.5 | 0.8 | 0.4 |
| b | 47 | 1.2 | 2.38 | 1.5 | 1.0 | 0.5 |
| c | 52 | 1.135 | 2.38 | 1.5 | 1.0 | 0.6 |
| d | 62 | 1.195 | 3.17 | 2.05 | 1.1 | 0.6 |

NOTE.—D=Outer diameter of the outer ring; h=Depth of the annular groove; an=Position of the annular groove; bn=Width of the annular groove; dw=Thickness of the anticreep ring; δ=Outward projection beyond the peripheral surface of the outer ring.

While there have been described herein what are at present considered preferred embodiments of the invention, such as the anticreep ring together with the bearing assembly, it will be obvious to those skilled in the art that many modifications and changes may be made therein without departing from the essence of the invention.

What is claimed is:

1. Anticreep bearing assembly provided with an anticreep ring having frictional engagement with each of a pair of radically spaced annular surfaces, said anticreep ring comprising a pair of outwardly expanded arched portions and an intermediate outwardly arched portion between said pair of outwardly expanded arched portions, both free ends of said outwardly expanded arched portions being frictionally engaged with a bottom surface of an annular groove of one of said annular surfaces while a middle portion of said intermediate arched portion and middle portion of each of said outwardly expanded portions being frictionally engaged with another of said annular surfaces whereby creep between said annular surfaces is restrained.

2. Anticreep bearing assembly according to claim 1, wherein said intermediate outwardly arched portion of said anticreep ring is further provided with an outwardly expanded arched portion whereby each of said outwardly expanded arched portions is frictionally engaged with said annular surface while both ends of said outwardly expanded portions and each connected portion between said intermediate arched portion and each of said outwardly expanded portions are frictionally engaged with said bottom of said annular groove, whereby creep between said annular surfaces is restrained.

3. Anticreep bearing assembly provided with an anticreep ring having frictional engagement with each of a pair of radically spaced annular surfaces, comprising a pair of inwardly expanded arched portions and an intermediate outwardly arched portion between said pair of inwardly expanded arched portions, both free ends of said inwardly expanded arched portions being frictionally engaged with an annular surface and said intermediate outwardly arched portion being frictionally engaged with a bottom of an annular groove formed upon another of said annular surfaces, whereby creep between said annular surfaces is restrained.

References Cited

UNITED STATES PATENTS 2,073,957    3/1937    Brouwer _____ 308—236

EDGAR W. GEOGHEGAN, Primary Examiner

H. F. SUSKO, Assistant Examiner